(12) United States Patent
Shea

(10) Patent No.: US 10,633,098 B2
(45) Date of Patent: Apr. 28, 2020

(54) ENVIRONMENTAL CONTROL SYSTEM

(71) Applicant: Hamilton Sundstrand Corporation, Windsor Locks, CT (US)

(72) Inventor: Brian R. Shea, Windsor, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 153 days.

(21) Appl. No.: 15/332,443

(22) Filed: Oct. 24, 2016

(65) Prior Publication Data

US 2018/0111693 A1    Apr. 26, 2018

(51) Int. Cl.
| | | |
|---|---|---|
| *B64D 13/06* | (2006.01) | |
| *B64D 13/02* | (2006.01) | |
| *B64D 13/08* | (2006.01) | |

(52) U.S. Cl.
CPC ............ *B64D 13/06* (2013.01); *B64D 13/02* (2013.01); *B64D 13/08* (2013.01); *B64D 2013/064* (2013.01); *B64D 2013/0618* (2013.01); *B64D 2013/0625* (2013.01)

(58) Field of Classification Search
CPC ......... B64D 13/00; B64D 13/06; B64D 13/08
See application file for complete search history.

(56) References Cited

U.S. PATENT DOCUMENTS

| | | | |
|---|---|---|---|
| 2,871,671 A | 2/1959 | Bartlett, Jr. et al. | |
| 3,177,676 A | 4/1965 | Abrahams | |
| 4,185,469 A * | 1/1980 | Rogers | B64D 13/04 62/172 |
| 4,262,495 A | 4/1981 | Gupta et al. | |
| 6,070,418 A | 6/2000 | Crabtree et al. | |
| 7,305,842 B1 | 12/2007 | Schiff | |
| 9,656,756 B2 * | 5/2017 | Atkey | B64D 13/08 |
| 2001/0025507 A1 * | 10/2001 | Buchholz | B64D 13/06 62/402 |
| 2010/0310392 A1 * | 12/2010 | Lippold | B64D 13/00 417/405 |
| 2012/0285184 A1 * | 11/2012 | Voinov | B64D 13/06 62/87 |
| 2013/0180270 A1 * | 7/2013 | Lemieux | F25B 9/06 62/86 |
| 2014/0144163 A1 | 5/2014 | Klimpel et al. | |
| 2016/0231031 A1 | 8/2016 | Bruno | |

FOREIGN PATENT DOCUMENTS

| | | |
|---|---|---|
| EP | 1386837 A1 | 2/2004 |
| EP | 2998223 A1 | 3/2016 |

OTHER PUBLICATIONS

European Search Report for European Application No. 17197940.4 dated Nov. 29, 2017, 7 pages.

* cited by examiner

*Primary Examiner* — Ljiljana V. Ciric
*Assistant Examiner* — Alexis K Cox
(74) *Attorney, Agent, or Firm* — Cantor Colburn LLP

(57) ABSTRACT

An environmental control system includes a turbo-compressor assembly and a ram air system. The turbo-compressor assembly includes a first turbine, a first compressor, and a first heat exchanger. The first heat exchanger has a first heat exchanger first side in fluid communication a first turbine outlet, a first heat exchanger second side, a first heat exchanger inlet in fluid communication a first compressor outlet, and a first heat exchanger outlet. The ram air system has a first ram air inlet in fluid communication with the first heat exchanger second side, and a second heat exchanger in fluid communication with the first ram air inlet.

6 Claims, 1 Drawing Sheet

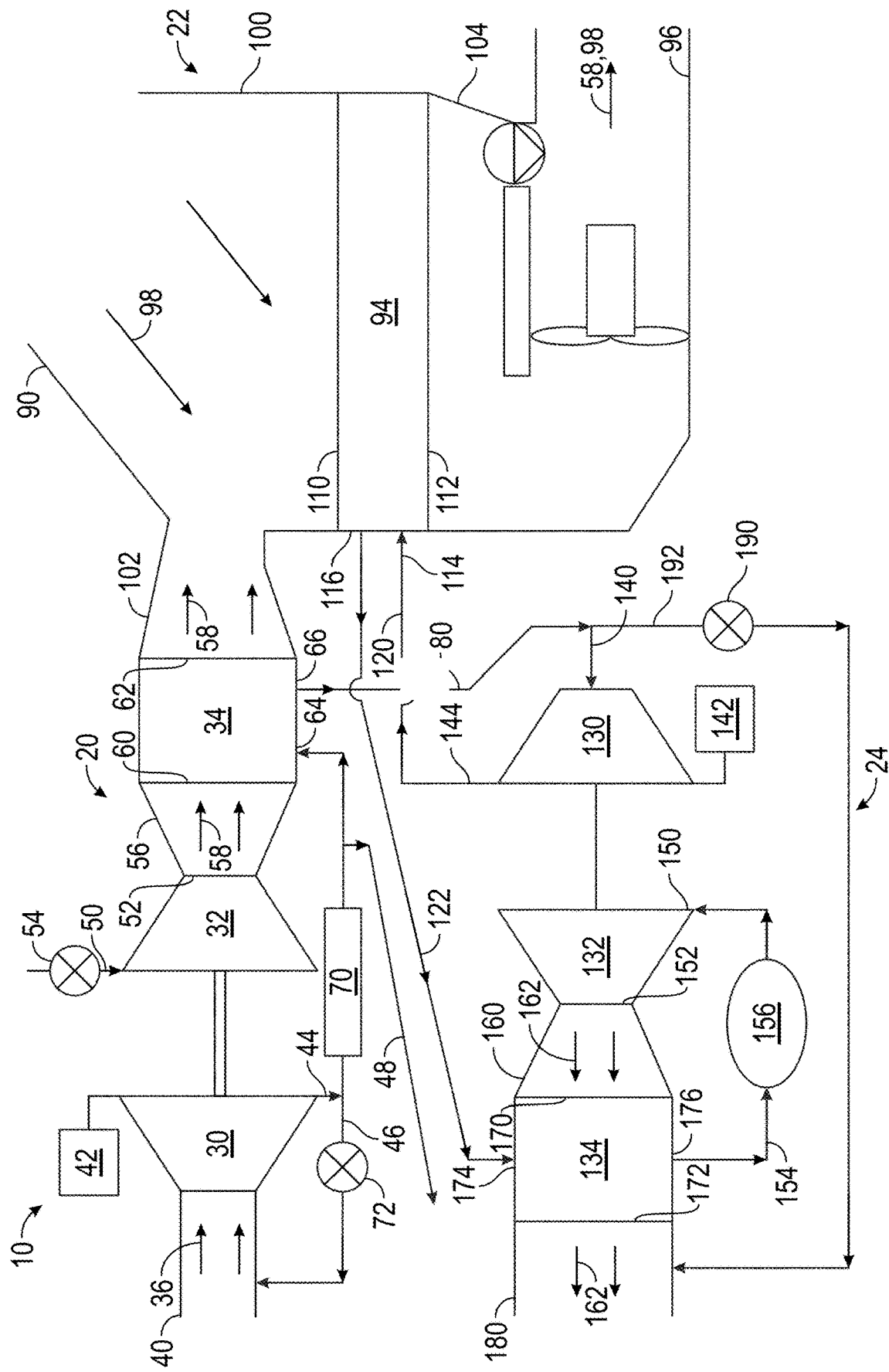

ENVIRONMENTAL CONTROL SYSTEM

BACKGROUND

Illustrative embodiments pertain to the art of environmental control systems, more specifically to a turbo-compressor cabin air conditioning system having dual air cycle machines.

Aircraft are provided with an environmental control system that is configured to provide conditioned air to an aircraft cabin. The environmental control system may include ram air cooled heat exchangers and an air conditioning pack that supplies the conditioned air to the aircraft cabin.

BRIEF DESCRIPTION

According to an embodiment of the present disclosure, an environmental control system for an aircraft is provided. The environmental control system includes a turbo-compressor assembly, a ram air system, and an air cycle machine. The turbo-compressor assembly includes a first compressor, a first turbine, and a first heat exchanger. The first compressor has a first compressor inlet configured to receive ambient air and a first compressor outlet. The first turbine is operationally connected to the turbo-compressor compressor. The first turbine has a first turbine inlet that receives bleed air from a gas turbine engine and a first turbine outlet. The first heat exchanger has a first heat exchanger first side in fluid communication the first turbine outlet, a first heat exchanger second side, a first heat exchanger inlet in fluid communication the first compressor outlet, and a first heat exchanger outlet. The ram air system has a first ram air inlet in fluid communication with the first heat exchanger second side, and a second heat exchanger. The air cycle machine is in fluid communication with the first heat exchanger and the second heat exchanger.

According to another embodiment of the present disclosure, an environmental control system for an aircraft is provided. The environmental control system includes a turbo-compressor assembly and a ram air system. The turbo-compressor assembly includes a first turbine, a first compressor, and a first heat exchanger. The first turbine has a first turbine inlet and a first turbine outlet. The first compressor has a first compressor inlet provided with a first variable diffuser and a first compressor outlet. The first heat exchanger has a first heat exchanger first side in fluid communication the first turbine outlet, a first heat exchanger second side, a first heat exchanger inlet in fluid communication the first compressor outlet, and a first heat exchanger outlet. The ram air system has a first ram air inlet, a second ram air inlet being in fluid communication with the first heat exchanger second side, and a second heat exchanger being in fluid communication with at least one of the first ram air inlet and the second ram air inlet.

According to yet another embodiment of the present disclosure, a method of providing conditioned air to an aircraft cabin. The method includes driving a first turbine with bleed air from a gas turbine and discharging the bleed air through a first turbine outlet through a first heat exchanger and into a ram air system that is arranged to receive ram air. The first turbine drives a first compressor with the first turbine to draw in ambient air through a first variable diffuser. The method further includes receiving the ambient air at the first heat exchanger through a first heat exchanger inlet and discharging the ambient air through a first heat exchanger outlet into an air cycle machine.

BRIEF DESCRIPTION OF THE DRAWINGS

The following descriptions should not be considered limiting in any way. With reference to the accompanying drawings, like elements are numbered alike:

FIG. 1 is a schematic diagram of an environmental control system of an aircraft.

DETAILED DESCRIPTION

A detailed description of one or more embodiments of the disclosed system and method are presented herein by way of exemplification and not limitation with reference to the Figures.

Referring to FIG. 1, a schematic diagram of an environmental control system 10 for an aircraft is illustrated. The environmental control system 10 is configured to receive ambient air from an air scoop of the aircraft and/or bleed air from an engine such as a gas turbine engine of the aircraft. In at least one embodiment, the environmental control system 10 is configured to receive bleed air supplied from the cabin air compressor or supercharger that may be powered independently of the gas turbine engine. The environmental control system 10 includes a turbo-compressor assembly 20, a ram air system 22, and an air cycle machine 24.

The turbo-compressor assembly 20 includes a first compressor 30, a first turbine 32, and a first heat exchanger 34.

The first compressor 30 is configured to receive ambient air 36 and compress the ambient air 36 and to supply the compressed ambient air to the air cycle machine 24. The first compressor 30 is driven by the first turbine 32. The first compressor 30 includes a first compressor inlet 40 provided with a first variable diffuser 42 and a first compressor outlet 44. The first compressor inlet 40 is configured to receive ambient air 36 through an aircraft air scoop. The first variable diffuser 42 is configured to vary the geometry of the first compressor inlet 40 to vary a cross-sectional area of the first variable diffuser 42 to vary a flow rate of the ambient air 36 through the first compressor 30 to optimize performance of the first compressor 30. The first compressor outlet 44 is fluidly connected to a first conduit 46 that extends between the first compressor 30 and at least one of the first turbine 32 and the first heat exchanger 34. In at least one embodiment, a bypass 48 is operatively connected to the first conduit 46. The bypass 48 is configured to deliver compressed ambient air to other portions of the aircraft, i.e. to trim.

The first turbine 32 is operationally connected to the first compressor 30. The first turbine 32 is configured to receive bleed air from the gas turbine engine to drive the first compressor 30 to intake and compress ambient air that is received through the aircraft air scoop. The first turbine 32 includes a first turbine inlet 50 and a first turbine outlet 52. The first turbine inlet 50 is configured to receive bleed air from the gas turbine engine through a control valve 54. The control valve 54 is disposed between a bleed air system of the gas turbine engine and the first turbine inlet 50. The control valve 54 is arranged or positioned to selectively control a bleed air flow between the bleed air system and the first turbine inlet 50. The first turbine 32 is driven by the bleed air and the bleed air is then expanded by the first turbine 32 and is discharged through the first turbine outlet 52 to the first heat exchanger 34.

A first duct 56 extends between the first turbine 32 and the first heat exchanger 34. The first duct 56 receives the expanded bleed air 58 through the first turbine outlet 52 and provides the expanded bleed air to the first heat exchanger 34.

The first heat exchanger 34 is configured as an air to air heat exchanger. The first heat exchanger 34 includes a first heat exchanger first side 60, a first heat exchanger second side 62, a first heat exchanger inlet 64, and a first heat exchanger outlet 66.

The first heat exchanger first side 60 is in fluid communication with the first turbine outlet 52 through the first duct 56. The expanded bleed air 58 that is passed through the first heat exchanger 34 is exhausted/discharged through the first heat exchanger second side 62.

The first heat exchanger inlet 64 is in fluid communication with the first compressor outlet 44 through the first conduit 46. The first heat exchanger inlet 64 is configured to receive the ambient air 36 that is compressed by the first compressor 30 through the first conduit 46. The ambient air 36 is pre-conditioned by the first heat exchanger 34 and is discharged through the first heat exchanger outlet 66. The pre-conditioned ambient air 36 is delivered to the air cycle machine 24.

A flow sensor 70 and a first valve 72 are provided and are operatively connected to the first conduit 46. The flow sensor 70 is operatively connected to the first conduit 46 and is arranged or positioned to monitor fluid flow through the first conduit 46. The flow sensor 70 is disposed between the first compressor outlet 44 and the first heat exchanger inlet 64. The flow sensor 70 is in communication with and is configured to control a position of the first variable diffuser 42 and the control valve 54.

The flow sensor 70 is in communication with a controller or a control system that is configured to control or vary a position of the first variable diffuser 42, the control valve 54, and/or the first valve 72 based on a flow rate through the first conduit 46 to control the amount of ambient air and the amount of bleed air that is received by the environmental control system 10 through the aircraft air scoop and the first turbine 32, respectively.

The first valve 72 is disposed between the first compressor inlet 40 and the first compressor outlet 44. The first valve 72 is arranged or positioned to selectively control the flow through the first conduit 46 between the first compressor outlet 44 and the first compressor inlet 40. The first valve 72 is configured as an add heat valve that is configured to aid in controlling an outlet temperature of the first compressor outlet 44 during cold ambient temperatures.

The first heat exchanger outlet 66 is in fluid communication with the air cycle machine 24 through a second conduit 80.

The ram air system 22 is configured to receive ambient air through an aircraft scoop and is configured to receive the expanded bleed air from the first heat exchanger 34. The ram air system 22 includes a first ram air inlet 90 a second heat exchanger 94, and a ram air outlet 96.

The first ram air inlet 90 is configured to receive ram air 98 through another aircraft scoop. Another aircraft scoop may be an aircraft scoop that is separate from the aircraft scoop that provides ambient air to the first compressor 30. The first ram air inlet 90 is defined by a ram air inlet duct 100.

A second duct 102 extends between the first heat exchanger second side 62 and the ram air inlet duct 100 and is configured to receive the expanded bleed air 58. The ram air 98 that is received through the first ram air inlet 90 and the expanded bleed air 58 that is received through the second duct 102 is mixed within the ram air inlet duct 100 and is provided to the second heat exchanger 94.

The second heat exchanger 94 is configured as an air to air heat exchanger. The second heat exchanger 94 is of a larger size than the first heat exchanger 34. The second heat exchanger 94 is disposed within at least one of the ram air inlet duct 100 and the ram air outlet duct 104. The second heat exchanger 94 includes a second heat exchanger first side 110, a second heat exchanger second side 112, the second heat exchanger inlet 114, and the second heat exchanger outlet 116.

The second heat exchanger first side 110 is in fluid communication with the first ram air inlet 90 and the second duct 102. The second heat exchanger first side 110 is configured to receive a mixture of the ram air 98 and the expanded bleed air 58. The mixture of the ram air 98 and the expanded bleed air 58 passes through the second heat exchanger 94 and is exhausted/discharged through the second heat exchanger second side 112. The mixture of the ram air 98 and the expanded bleed air 58 is exhausted through the ram air outlet duct 104. The ram air outlet duct 104 is configured to exhaust the mixture of the ram air 98 and the expanded bleed air 58 outside or overboard the aircraft. In at least one embodiment, a ram fan is disposed within the ram air outlet duct 104 to aid in drawing the ram air 98 and/or the expanded bleed air 58 through the second heat exchanger 94.

The second heat exchanger inlet 114 is in fluid communication with the air cycle machine 24 through a third conduit 120. The second heat exchanger inlet 114 is configured to receive compressed air that is exhausted/discharged from the air cycle machine 24 through the third conduit 120.

The second heat exchanger outlet 116 is in fluid communication with the air cycle machine 24 through a fourth conduit 122. The second heat exchanger outlet 116 is configured to provide cooled compressed air to the air cycle machine 24 through the fourth conduit 122.

The air cycle machine 24 is configured to receive ambient air 36 that is compressed through the first compressor 30 through the second conduit 80 and is configured to discharge conditioned air to the aircraft cabin. The air cycle machine 24 is in fluid communication with the first heat exchanger 34 and the second heat exchanger 94. The air cycle machine 24 includes a second compressor 130, a second turbine 132, and a condenser 134.

The second compressor 130 is configured to receive and compress the compressed and cooled ambient air provided through the first compressor 30. The second compressor 130 includes a second compressor inlet 140 provided with a second variable diffuser 142 and a second compressor outlet 144. The second compressor inlet 140 is in fluid communication with the first heat exchanger outlet 66 through the second conduit 80. The second variable diffuser 142 is configured to vary the geometry of the second compressor inlet 140 to vary a cross-sectional area of the second variable diffuser 142 to vary a flow rate of the compressed ambient air through the second compressor 130. The second variable diffuser 142 may be in communication with the first variable diffuser 42 such that the controller may optimize performance of the environmental control system 10 and vary a position of the second variable diffuser 142 and the first variable diffuser 42 based on an output provided by the flow sensor 70. The second compressor outlet 144 is in fluid communication with the second heat exchanger inlet 114 through the third conduit 120.

The second turbine 132 is operationally connected to the second compressor 130. The second turbine 132 is configured to receive the again compressed and subsequently dried ambient air from the second compressor 130 that has been conditioned by the second heat exchanger 94 and/or the condenser 134. The second turbine 132 includes a second turbine inlet 150 and a second turbine outlet 152. The second turbine inlet 150 is configured to receive conditioned and dried air through a fifth conduit 154 having a water collector 156. The fifth conduit 154 extends between the condenser 134 and the second turbine 132.

A third duct 160 extends between the second turbine 132 and the condenser 134. The third duct 160 receives the expanded ambient air 162 from the second turbine outlet 152 and provides the expanded ambient air 162 to the condenser 134.

The condenser 134 includes a first condenser side 170, a second condenser side 172, a condenser inlet 174, and a condenser outlet 176. The first condenser side 170 is in fluid communication with the second turbine outlet 152 through the third duct 160. The expanded ambient air 162 passes through the condenser 134 and is exhausted/discharged through the second condenser side 172. The second condenser side 172 is in fluid communication with a cabin air inlet. The expanded ambient air 162 that is exhausted/discharged through the second condenser side 172 is delivered to the aircraft cabin through a fourth duct 180 that is operatively connected to the cabin air inlet.

The condenser inlet 174 is in fluid communication with the second heat exchanger outlet 116 through the fourth conduit 122. The condenser inlet 174 receives ambient air that is discharged through the second heat exchanger outlet 116. The condenser outlet 176 is in fluid communication with the second turbine inlet 150 through the fifth conduit 154. The condenser outlet 176 discharges the conditioned and dried ambient air and provides the conditioned and dried ambient air to the second turbine inlet 150. The water collector 156 removes moisture from the air that flows through the fifth conduit 154 prior to the air entering the second turbine inlet 150. The moisture collected within the water collector 156 may be provided to a ram sprayer that extends into the first ram air inlet 90.

A bypass valve 190 is operatively connected to an extension 192 of the second conduit 80. The bypass valve 190 is disposed between the first heat exchanger outlet 66 and the cabin air inlet or fourth duct 180. The bypass valve 190 is arranged or positioned to selectively enable compressed ambient air that is discharged through the first heat exchanger outlet 66 to bypass the second compressor 130 and then delivered to the fourth duct 180 and ultimately to the cabin air inlet. The bypass valve 190 is positioned or arranged to selectively control a flow between the first heat exchanger outlet 66 and the cabin air inlet.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for an aircraft, comprising:
   a turbo-compressor assembly comprising:
      a first compressor having a first compressor inlet configured to receive ambient air and a first compressor outlet that is configured to exhaust compressed ambient air,
      a first turbine operationally connected to the first compressor, the first turbine having a first turbine inlet that is configured to receive bleed air from a gas turbine engine and a first turbine outlet that is configured to exhaust expanded bleed air, and
      a first heat exchanger having a first heat exchanger first side that is configured to receive expanded bleed air from the first turbine outlet, a first heat exchanger second side that is configured to exhaust expanded bleed air, a first heat exchanger inlet that is configured to receive compressed ambient air from the first compressor outlet, and a first heat exchanger outlet that is configured to exhaust compressed ambient air;
   a ram air system having:
      a first ram air inlet that is configured to receive ram air,
      a duct that is configured to receive expanded bleed air from the first heat exchanger second side, and
      a second heat exchanger having a first side that is configured to receive a mixture of the ram air and the expanded bleed air from the first heat exchanger second side; and
   an air cycle machine that includes:
      a second compressor that has a second compressor inlet that is configured to receive compressed ambient air from the first heat exchanger outlet and a second compressor outlet that is configured to exhaust further compressed ambient air to the second heat exchanger; and
      a condenser that has:
         a condenser inlet on one condenser side that is configured to receive from the second heat exchanger the further compressed ambient air having been cooled by the mixture of the ram air and the expanded bleed air; and
         a condenser output that is ducted to a cabin inlet to exhaust cooled air to the cabin inlet.

2. The environmental control system of claim 1, wherein the second heat exchanger has a second heat exchanger first side in fluid communication with the first ram air inlet, a second heat exchanger second side, a second heat exchanger inlet, and a second heat exchanger outlet.

3. The environmental control system of claim 2, wherein:
the second turbine is operationally connected to the second compressor, the second turbine having a second turbine inlet and a second turbine outlet; and
the condenser has another condenser side in fluid communication with the second turbine outlet.

4. The environmental control system of claim 3, wherein the condenser outlet is in fluid communication with the second compressor inlet.

5. The environmental control system of claim 1, further comprising a bypass valve disposed between the first heat exchanger outlet and the cabin air inlet, the bypass valve being positioned to selectively control a flow between the first heat exchanger outlet and the cabin air inlet.

6. The environmental control system of claim 1, further comprising a first valve operatively disposed between the first compressor inlet and the first compressor outlet.

\* \* \* \* \*